(12) United States Patent
Gerdes et al.

(10) Patent No.: US 7,681,478 B2
(45) Date of Patent: Mar. 23, 2010

(54) METHOD AND APPARATUS FOR RESURFACING BRAKE ROTORS

(75) Inventors: Michael D. Gerdes, St. Peters, MO (US); Michael A. Olsen, Lake St. Louis, MO (US); Nicholas J. Colarelli, III, St. Louis, MO (US); Matt Wise, Wildwood, MO (US); Gerry E. Friton, Chesterfield, MO (US)

(73) Assignee: Hunter Engineering Company, Bridgeton, MO (US)

( * ) Notice: Subject to any disclaimer, the term of this patent is extended or adjusted under 35 U.S.C. 154(b) by 51 days.

(21) Appl. No.: 12/028,385

(22) Filed: Feb. 8, 2008

(65) Prior Publication Data

US 2008/0121076 A1 May 29, 2008

Related U.S. Application Data

(62) Division of application No. 10/890,345, filed on Jul. 13, 2004.

(60) Provisional application No. 60/489,639, filed on Jul. 24, 2003.

(51) Int. Cl.
*B23B 5/04* (2006.01)
*B23B 3/22* (2006.01)

(52) U.S. Cl. .......................... 82/1.11; 82/112

(58) Field of Classification Search ................. 82/1.11, 82/112, 133; 29/802, 894.36, 894.361; 310/321
See application file for complete search history.

(56) References Cited

U.S. PATENT DOCUMENTS

| 3,345,884 | A | * | 10/1967 | Kuderko ..................... 464/180 |
| 4,138,825 | A | | 2/1979 | Pelta |
| 4,180,915 | A | | 1/1980 | Lill et al. |
| 5,029,395 | A | | 7/1991 | Brauer et al. |
| 5,052,111 | A | | 10/1991 | Carter et al. |
| 5,174,179 | A | | 12/1992 | Hiestand |
| 5,653,153 | A | | 8/1997 | Greenwald |
| 5,765,457 | A | | 6/1998 | Meyer et al. |
| 5,970,427 | A | | 10/1999 | Greenwald |
| 5,974,878 | A | | 11/1999 | Newell et al. |

(Continued)

FOREIGN PATENT DOCUMENTS

EP 1072343 A1 1/2001

OTHER PUBLICATIONS

"The Effects of Variable Speed Cutting on Vibration Control in Face Milling" S.C. Lin, R.E. DeVor, S.G. Kapoor—Dept. of Mechanical and Industrial Engineering, University of Illinois at Urbana-Champaign, Urbana, IL 61801 (Journal of Engineering for Industry), Feb. 1990—pp. 1-11.

*Primary Examiner*—Will Fridie, Jr.
(74) *Attorney, Agent, or Firm*—Polster, Lieder, Woodruff & Lucchesi, L.C.

(57) ABSTRACT

The present invention relates to automotive vehicle brake lathes configured for resurfacing brake rotor components, and in particular, to an improved on-car brake lathe apparatus and a method for reducing vibrations during resurfacing of brake rotor components with a brake lathe having a variable speed spindle motor, an output spindle rotationally driven by the variable speed motor adapted to couple the brake lathe to the brake rotor component, and at least one adjustable cutting tip adapted to engage a surface of the vehicle brake component.

20 Claims, 13 Drawing Sheets

U.S. PATENT DOCUMENTS

| | | |
|---|---|---|
| 6,011,345 A * | 1/2000 | Murray et al. ............... 310/321 |
| 6,050,160 A | 4/2000 | Newell et al. |
| 6,101,911 A | 8/2000 | Newell et al. |
| 6,216,571 B1 | 4/2001 | Newell et al. |
| 6,324,908 B1 | 12/2001 | Colarelli, III et al. |
| 6,327,947 B1 | 12/2001 | Newell et al. |
| 6,330,847 B2 | 12/2001 | Newell et al. |
| 6,363,821 B1 | 4/2002 | Greenwald et al. |
| 6,386,031 B2 | 5/2002 | Colarelli, III et al. |
| 6,389,895 B2 | 5/2002 | Colarelli, III et al. |
| 6,474,203 B1 | 11/2002 | Newell et al. |
| 6,477,928 B2 | 11/2002 | Newell et al. |
| 6,591,720 B1 | 7/2003 | Greenwald et al. |
| 6,729,212 B2 | 5/2004 | Muller |
| 2005/0016338 A1 * | 1/2005 | Gerdes et al. ................. 82/112 |
| 2005/0261109 A1 * | 11/2005 | Winkel et al. ................. 477/92 |
| 2006/0030979 A1 * | 2/2006 | Kuang et al. ................. 701/22 |

* cited by examiner

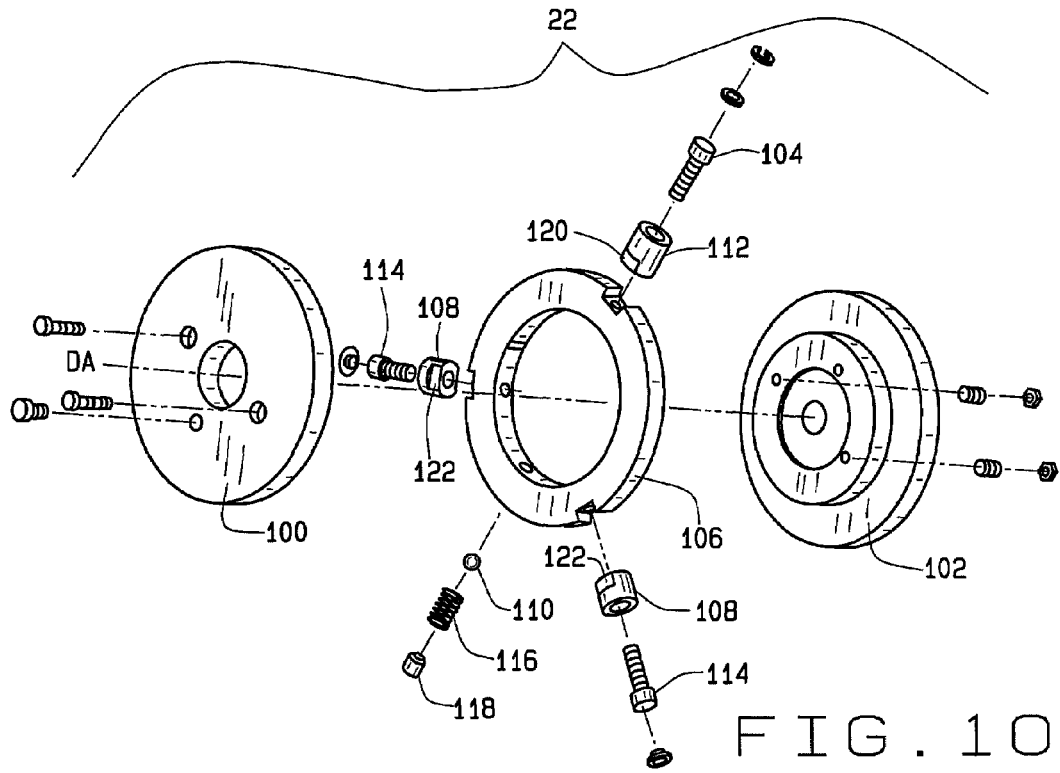
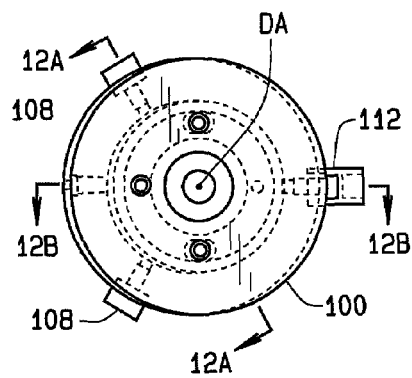
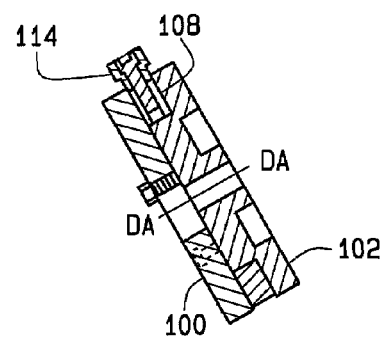
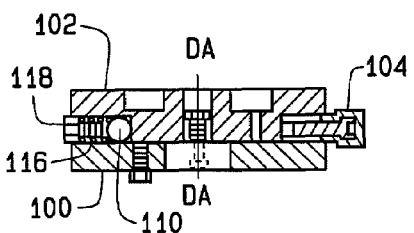
FIG. 10
FIG. 11
FIG. 12A
FIG. 12B

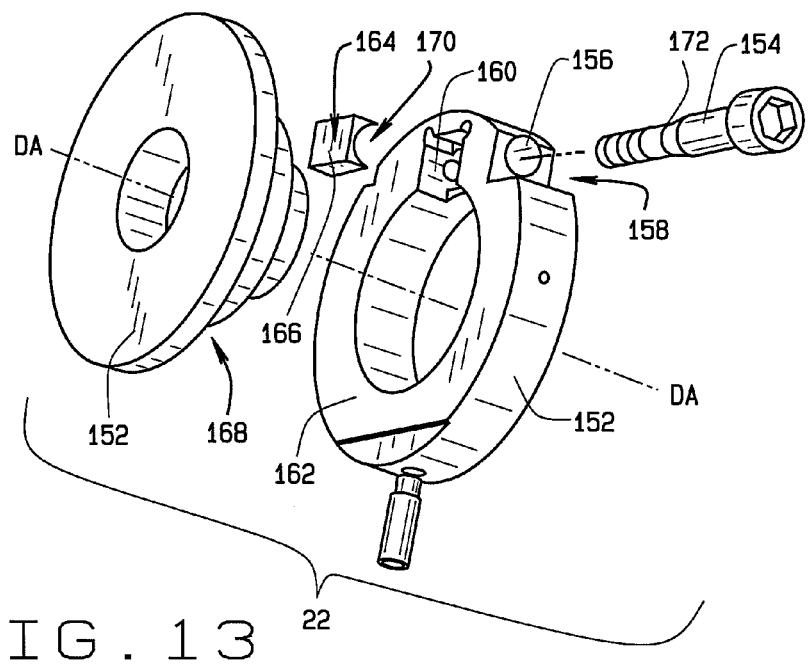
FIG. 13
PRIOR ART
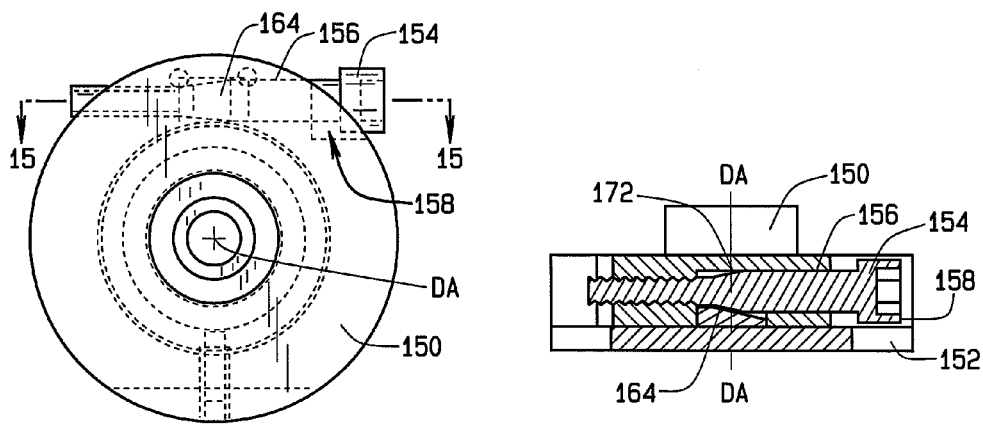
FIG. 14
PRIOR ART
FIG. 15
PRIOR ART

METHOD AND APPARATUS FOR RESURFACING BRAKE ROTORS

CROSS-REFERENCE TO RELATED APPLICATIONS

This application is a divisional of, and claims priority from, U.S. patent application Ser. No. 10/890,345 filed on Jul. 13, 2004 which is related to, and claims priority from, U.S. Provisional Patent Application Ser. No. 60/489,639 filed on Jul. 24, 2003, both of which are herein incorporated by reference.

STATEMENT REGARDING FEDERALLY SPONSORED RESEARCH

Not Applicable.

BACKGROUND OF THE INVENTION

The present invention relates to automotive vehicle brake lathes configured for resurfacing brake rotor components, and in particular, to an improved on-car brake lathe apparatus and a method for compensating for runout between an on-car brake lathe and a vehicle wheel hub to which the on-car brake lathe is secured for a brake rotor resurfacing operation.

One of the main components of a vehicle wheel braking system employing rotor brakes are the brake rotors, which provide a solid rotating surface against which the stationary brake friction pads are clamped or compressed to generate a frictional force, slowing the rotational movement of the brake rotors and the associated vehicle wheels. The brake rotors are subjected to repeated and substantial frictional forces by the brake friction pads, and over time, become worn. Uneven application of braking force, debris, or uneven frictional surfaces on the brake friction pads can result in the formation of grooves, channels, or scratches in the surfaces of the brake rotors. Repeated heating and cooling of the brake rotor resulting in extreme temperature variations can additionally result in the lateral warping of the brake rotor.

A worn or warped brake rotor may be resurfaced by cutting or grinding to provide a uniform smooth brake friction pad contact surface if sufficient brake rotor material remains to provide an adequate braking surface without compromising the structural integrity of the vehicle braking system. However, once a brake rotor has been worn below a minimum safe thickness, it is unable to safely dissipate the heat generated by a brake application, and must be replaced.

To provide for a uniform surface, any abnormalities in the brake rotor, such as a lateral warping must be detected and removed during the resurfacing procedures. An additional source of lateral warping defects in a brake rotor or brake rotor is often over tightened attachment bolts or an uneven mounting surface onto which the brake rotor is secured in the vehicle wheel assembly. If the brake rotor is removed from the vehicle wheel assembly for a resurfacing operation on a fixed or "bench" brake lathe any abnormalities or defects resulting from the mounting of the brake rotor to the vehicle wheel assembly may not be accurately identified or corrected during the resurfacing procedure. Accordingly, a variety of brake resurfacing machines or brake lathes have been developed to resurface brake rotors while they remain mounted to the vehicle wheel assembly.

Brake resurfacing machines or brake lathes configured to resurface brake rotors mounted to a vehicle wheel assembly are commonly referred to as on-car brake lathes. Examples of an on-car brake lathe include the OCL-360 and OCL-400 brake lathes sold by Hunter Engineering Co. of Bridgeton, Mo. By eliminating the need to remove the brake rotor from the vehicle wheel assembly, the overall efficiency of the resurfacing procedure is improved, and the chances for operator induced error are reduced. However, the resurfacing of brake rotors which remain mounted to the vehicle wheel assembly requires that the on-car brake lathe and the vehicle wheel assembly, including the brake rotor, be aligned along a common axis, typically, the rotational axis of the vehicle wheel assembly hub onto which the on-car brake lathe is secured.

Often, the hub surface to which the vehicle wheel assembly mounts is not aligned within a required tolerance to the axis of rotation for the axle upon which the vehicle wheel assembly is secured. This deviation between the hub surface and the axis of rotation for the wheel assembly is referred to as lateral runout, and must be compensated for either manually or automatically before beginning the resurfacing procedures with the on-car brake lathe.

Manual runout compensation procedures are tedious and complex. First, an operator secures the output spindle of the on-car brake lathe to the vehicle wheel hub using a suitable adapter. Next, a motor in the on-car brake lathe is activated to rotate the output spindle, the adapter, and brake rotor. Any runout present in the system is directly measured by one or more measurement devices, which provide the operator with a suitable visual indication representative of the actual runout experienced by the on-car brake lathe as the adapter is rotated through one or more complete rotations. Using the visual indication, the operator manually adjusts one or more mechanical adjustment elements, such as screws or dials, altering the rotational axis of the on-car brake lathe output spindle to reduce the observed runout to within an acceptable tolerance for performing the resurfacing of the brake rotor.

To reduce the observed runout to within the desired tolerances using the manual runout compensation procedure usually requires several iterations when carried out by a skilled operator. The extra time spent by an operator to setup the on-car brake lathe and perform the manual runout compensation can substantially increase the time required to complete a brake rotor resurfacing, resulting in a corresponding increase in cost and lost productivity.

Accordingly, a number of on-car brake lathe devices have been configured with active automatic runout compensation mechanisms which do not require significant operator input. Such active automatic runout compensation mechanisms are shown in European Patent Application No. 1 0172 343 A1 to Costruzioni Mechaniche Caorle S.p.A., based on Italian Patent No. 0248591 Y1, and in U.S. Pat. No. 6,101,911 to Newell et al. The automatic runout compensation mechanism shown in the '911 Newell et al. patent includes at least one adjustment rotor interposed between a pair of adapters and which is concentric about an axial drive shaft. The on-car brake lathe motor and cutting elements are secured to one adapter, and the entire mechanism secured to the vehicle wheel hub via the second adapter. The adjustment rotor includes a slanted surface in engagement with either a second adjustment rotor having an opposing slanted surface or one of the adapters. An adjustment mechanism is utilized to alter the rotational orientation of the adjustment rotor about the axis of the axial drive shaft.

As the components of the '911 Newell et al. automatic runout compensation mechanism are rotated about the axis at a fixed speed of 120 PRM, runout is detected by an accelerometer. A processor receives an output signal from the accelerometer and provides corresponding control signals to an adjustment mechanism. Alteration of the rotation position of the adjustment rotor about the axis of the axial drive shaft as the components are rotated at the relatively high fixed rotational speed of 120 RPM compensates for the detected runout by attempting to alter the angle at which the two slanted surfaces are engaged, and correspondingly the angle between the first and second adapters. Due to significant high speed vibrations and the interaction of the various rotating components, such as bearings, gears, and shaft, errors are induced in the automatic runout compensation sensor signals. Thus, automatic runout compensation typically requires several complete rotations of the various components about the axis before the adjustment rotor rotational position is sufficiently altered to compensate for any detected runout.

The automated adjustment mechanism of the '911 Newell et al. patent associated with the use of the one or more slant rotors is a costly and complex mechanical arrangement. The mechanism requires an initial phasing or alignment of the adjustment rotors, followed by a lengthy trial-and-error adjustment process to compensate for any detected runout.

Accordingly, there is a need for on-car brake lathes having improved precision runout compensation mechanisms, which are not subjected to rotational movement noise and vibrations during runout measurements, and which can quickly and accurately compensate for detected runout, but which do not require complex and costly components.

With conventional on-car brake lathes, it is necessary to invert the orientation of the lathe when switching between sides of a vehicle. Inverting the lathe inverts the operator control panel, and can render the operation of the controls difficult, particularly as the number of controls or displays increased. Accordingly, there is a further need for an on-car brake lathe having a control panel which is adjustable so as to be presentable to an operator at a selected orientation, independent of the orientation of the on-car brake lathe.

Traditionally, on-car and bench brake lathes utilize motors or drive systems configured for operation at a fixed spindle RPM and feed rate. During rotor cutting or resurfacing, a resonance or vibration, commonly referred to as "chatter", can develop between the rotor cutting tools and the rotor surface, resulting at best in an uneven resurfacing of the brake rotor, or at worst, in severe damage to the rotor surface or rotor cutting tools themselves. Accordingly, the fixed spindle RPM and feed rates in traditional on-car and bench brake lathes are selected to be below the rates at which the resonance or vibration is likely to occur. Alternatively, such as shown in U.S. Pat. No. 6,591,720 B1 to Greenwald et al., vibration damping or attenuating components such as pads or elastomeric bands are brought into contact with the brake rotor during resurfacing to control or reduce undesired "chatter" resonance or vibrations.

Since it is known that "chatter" vibrations or resonances are a function of the spindle RPM, feed rates, and depth of the resurfacing cut, it would be advantageous to provide on-car and bench brake lathes with a reliable system to detect the presence of "chatter" vibrations or resonance during the cutting of the rotor, and to configure the brake lathes with one or more automatic adjustments to reduce or eliminate the vibrations before it affects the quality of the surface finish on the rotor. Since the rates at which the resonance or vibration are likely to occur vary for brake rotors of different sizes, thicknesses, and materials, it would be advantageous to provide an on-car brake lathe which is capable of varying the spindle RPM during the resurfacing of a brake rotor and, optionally, the linear feed rate of the cutting implements, up to a maximum rate at which a desired brake rotor resurfacing quality can be achieved, thereby reducing operator time require to resurface a brake rotor.

It is desirable to create a brake resurfacing system that will sense when the cut is completed and automatically stop the operation of the brake lathe, thereby reducing the time required for the operator to prepare the brake lathe to cut the next rotor.

Some vehicles are equipped with locking differentials in the vehicle drive train that engage when a difference in wheel rotational speed from one side of the vehicle to the other reaches approximately 100 RPM. When the locking mechanism engages, as may occur during rotation of a brake rotor by an on-car brake lathe, the resulting change in rotational resistance can violently rotate the entire on-car lathe body. It is desirable to provide an on-car brake lathe with safety features configured to automatically stop the lathe rotation if a sudden resistance is encountered in the cut.

With a wide variety of information related to vehicle specifications, including brake rotor thicknesses and dimensions, it would be advantageous to provide a brake lathe system with a communications interface by which the lathe can acquire at least vehicle specifications from a data network or other automotive service device. It is also desired that this communication system would be able to send data to a remote printer or console.

U.S. Pat. No. 6,363,821 B1 to Greenwald et al. discloses a vehicle brake lathe incorporating cutting tip contact sensors to provide signals to a controlling microprocessor to facilitate automated movement of the cutting tips relative to a brake rotor surface, as well as a determination of a depth of cut. However, the '821 Greenwald et al. patent does not appear to provide the brake lathe operator with a simple and efficient indication of contact between each individual cutting tip and the brake rotor surface. Accordingly, there is a need to provide improved feedback from an operating brake lathe to an operator, permitting proper adjustments of the cutting tips for depth of cut and runout measurement during rotor resurfacing, and ensuring proper engagement between a visually occluded cutting tip and a brake rotor surface without requiring an operator to move to within close proximity of rotating components during an adjustment or resurfacing procedure.

In addition to identifying contact between the cutting tips and a brake rotor surface, it is useful to provide a displayed measure of a depth of cut provided by the cutting tips. U.S. Pat. No. 6,363,821 B1 to Greenwald et al. provides a displayed depth of cut utilizing a displacement gauge positioned relative to each tool holder on a brake lathe. The displacement gauge in the '821 Greenwald, et al. patent directly measures the spatial separation or displacement between the two tool holders. To obtain a depth of cut measurement, an initial separation distance between the cutting bits is compared with a subsequent separation distance after a depth of cut adjustment has been made to a cutting bit. The calculated change in separation distance corresponds to the change in depth of cut of the cutting bit from the initial position plus the depth of cut for the opposite cutting bit (which is zero if it has not yet been adjusted). Hence, the position of both tool holders must be monitored to provide a depth of cut measurement for a single tool holder. Accordingly, it would be advantageous to provide a simplified depth-of-cut measurement system for a single tool holder on a brake lathe which does not require information related to the position of a second tool holder, or a measurement of displacement between a pair of tool holders, to provide a depth of cut measurement.

BRIEF SUMMARY OF THE INVENTION

Briefly stated, the present invention is an improved brake lathe system for the resurfacing of work pieces such as vehicle brake rotors. The improved brake lathe system is configured with a variable speed variable speed spindle motor and controller for regulating at least the work piece cutting rate and providing automatic shutdown of the brake lathe system when predetermined conditions are met, such as completion of a brake rotor resurfacing cut or detection of an abnormal operating condition.

In an alternate embodiment, a brake lathe of the present invention incorporates a variable speed spindle motor as a drive motor. Sensors incorporated into the brake lathe are configured to detect vibrations generated by the cutting tips when in contact with the work piece or brake rotor surface, and provide a feedback signal which is utilized to control the variable speed spindle motor RPM and optionally, the linear feed rate of the cutting tips. Preferably, the variable speed spindle motor is operated to provide a maximum RPM and feed rate at which the cutting tip vibrations are maintained below a predetermined threshold. The sensor signal will fall to a minimum level when the cut has ended, signaling the motor controller to stop operations.

In an alternate embodiment of the present invention, an on-car brake lathe is provided with a precision runout compensation system. The precision runout compensation system automatically directs a variable speed spindle motor to rotate the wheel coupling components of the on-car brake lathe to, and stops at, at least three discrete positions about an axis of rotation to obtain runout measurements after the on-car brake lathe has been coupled to a brake rotor. A sinusoidal representation of the runout present between the on-car brake lathe drive axis and the brake rotor rotational axis is calculated, and the variable speed spindle motor is again activated to rotate to, and stop the wheel coupling components at an adjustment position at which a single operator adjustment to the wheel coupling components can compensate for the runout present between the brake rotor and the wheel coupling components of the on-car brake lathe.

In an alternate embodiment, a brake lathe of the present invention incorporates a cutting tip contact indicator to provide an operator with a visual or audible indication of contact between each cutting tip and a surface of a workpiece or brake rotor. Each cutting tip is electrically coupled, through a power source, to an indicator circuit and to an electrical ground. Contact between a cutting tip and the workpiece or brake rotor provides a complete electrical circuit between the electrical ground and the power source, resulting in an electrical current flow through an associated indicator circuit. Preferably, the associated indicator circuit incorporates one or more LEDs, which are correspondingly illuminated to provide the operator with a visual confirmation of contact between the cutting tip and the workpiece or brake rotor surface.

In an alternate embodiment, an on-car brake lathe of the present invention incorporates a cutting tip contact indicator to provide an operator with a visual or audible indication of contact between each cutting tip and a surface of a workpiece or brake rotor. Sensors incorporated into the on-car brake lathe are configured to detect vibrations generated by a cutting tip in contact with the workpiece or brake rotor surface, and provide a feedback signal which is utilized to correspondingly illuminate one or more LEDs to provide the operator with a visual confirmation of contact between the cutting tip and the workpiece or brake rotor surface, or an audible indication thereof.

In an alternate embodiment, an on-car brake lathe of the present invention provides the operator with a depth of cut display. The information shown on the depth of cut display is based on signals received from a rotary encoder operatively coupled to the end of a threaded shaft upon which the cutting blade tool holders are disposed.

In an alternate embodiment, an on-car brake lathe of the present invention provides the operator with a rotor runout display. The information shown on the rotor runout display is based on signals received from a rotary encoder operatively coupled to the end of a threaded shaft upon which the cutting blade tool holders are disposed.

In an alternate embodiment, a brake lathe of the present invention is configured with a processor and associated communications circuits for exchanging information with one or more automotive service devices, such as a vehicle wheel aligner, vehicle wheel balancer, or automotive shop management system. The brake lathe is preferably configured to receive brake rotor specifications, such as diameter and thickness, and may be configured to communicate brake rotor resurfacing results to a display on the lathe or a remotely disposed printer or console. The processor may be further configured to utilize the received brake rotor specifications to establish limits on the range of movement for the cutting blade tool holders, or to establish an initial cutting speed and/or feed rate for a variable speed variable speed spindle motor.

In an alternate embodiment, a brake lathe of the present invention is configured with a control panel which is adjusted about an axis of rotation, to an orientation selected by the operator for ideal use and viewing independent of an orientation of the lathe body.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 10 is an exploded perspective view of a single-point compensation component of the present invention;

FIG. 11 is a front view of the single-point compensation component of FIG. 10;

FIG. 12A is a sectional view of FIG. 11, taken at line B-B;

FIG. 12B is a sectional view of FIG. 11, taken at line C-C;

FIG. 13 is an exploded perspective view of a prior art single-point compensation component utilized with the present invention;

FIG. 14 is a front view of the prior art single-point compensation component of FIG. 13;

FIG. 15 is a sectional view of prior art FIG. 14, taken at line A-A;

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1:
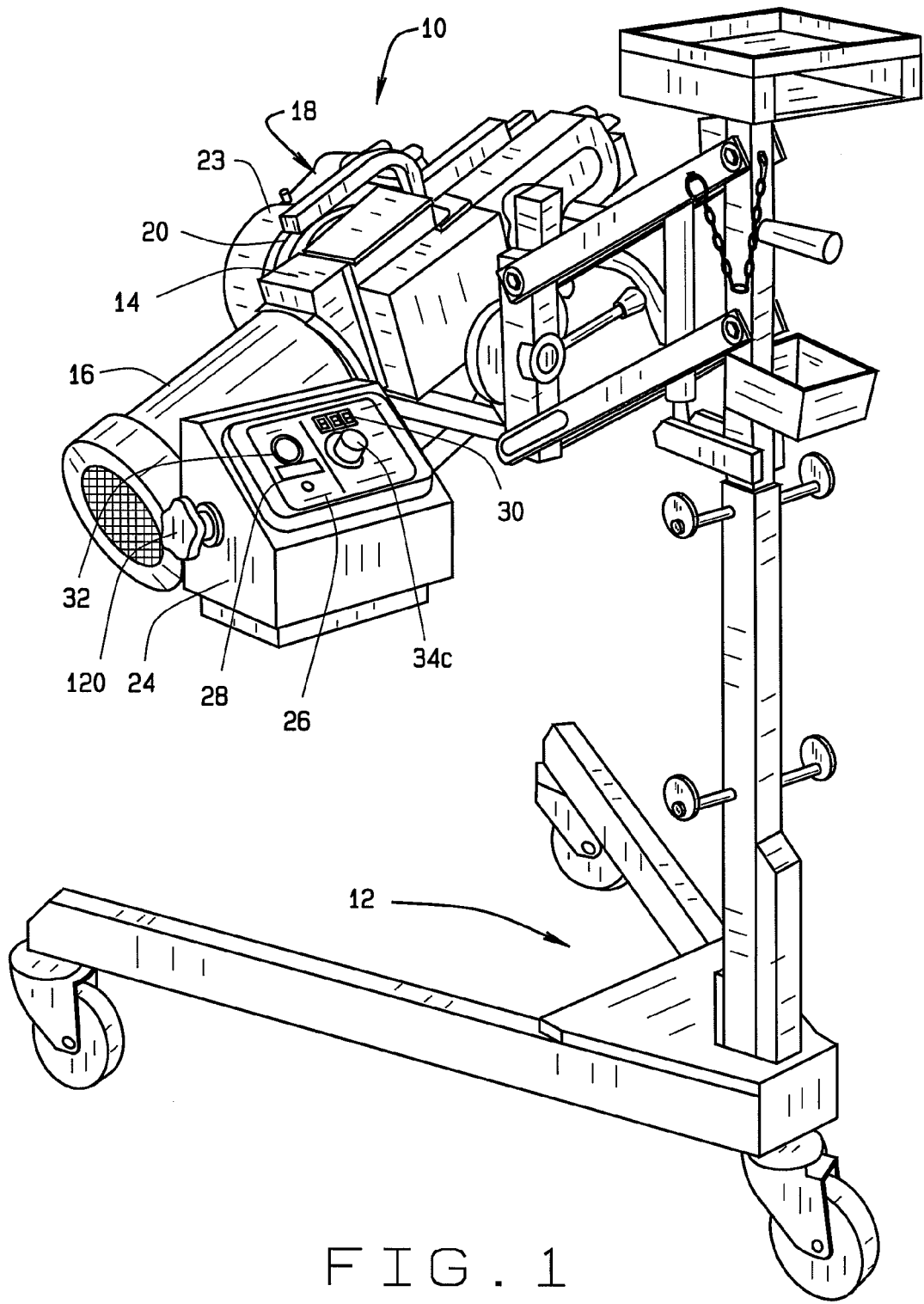
FIG. 1 is a perspective view of an on-car vehicle brake lathe of the present invention secured to a transport trolley.
Figure 2:
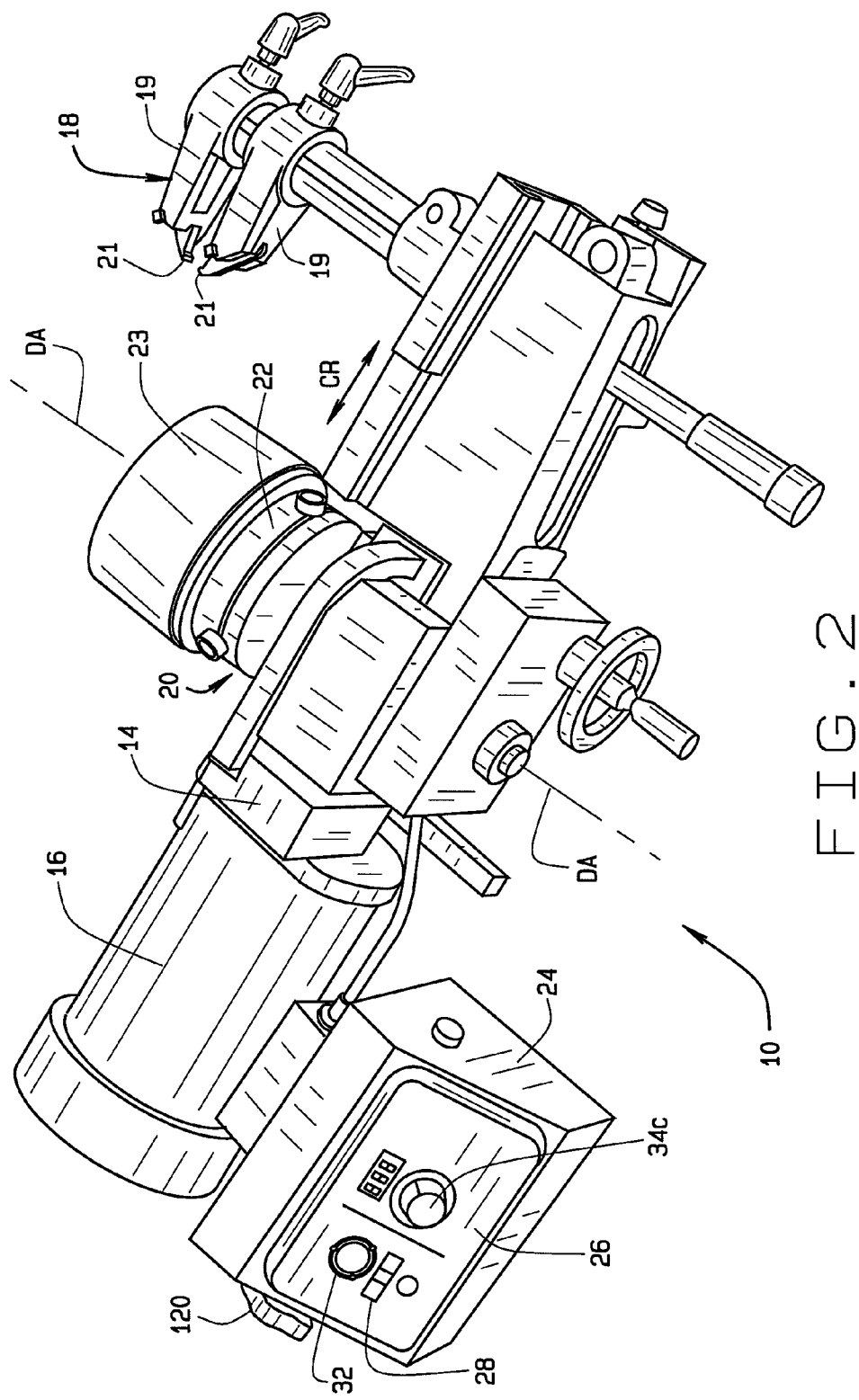
FIG. 2 is a top perspective view of an on-car vehicle brake lathe of the present invention.

Referring to FIGS. 1 and 2, an on-car brake lathe 10 of the present invention is shown mounted to a transport trolley 12 for positioning adjacent a vehicle to be worked on (not shown). The on-car brake lathe 10 includes a support structure 14, onto which is mounted a variable speed drive spindle motor 16, a an adjustable cutting head 18, and an output spindle 20. The variable speed spindle motor 16 is coupled to the output spindle 20 through a conventional drive mechanism (not shown) contained within the support structure 14, to rotate the output spindle 20 about a drive axis DA, and to linearly feed the cutting head 18 through a predetermined cutting range CR. An aligning joint 22 is secured to the output spindle 20, concentric with the drive axis DA, and include an adapter 23 adapted to couple the output spindle 20 to a vehicle wheel hub or brake assembly (not shown).

Additionally included on the support structure 14 is an operator console or electrical enclosure 24. An operator interface 26 is mounted to the electrical enclosure 24. The operator interface 26, shown in FIG. 3, preferably includes at least a bar graph LED display 28 and a numerical LED display 30, and may optionally include one or more additional visual display elements 32 configured to provide the operator with information associated with the operation of the on-car brake lathe 10. For example, multiple visual display elements 32 in the form of single LED lights may be disposed on the operator interface 26 to assist an operator in performing a runout compensation procedure when coupling the on-car brake lathe 10 with a vehicle brake assembly, or to indicate the presence of a chatter condition during a resurfacing procedure.

In order for the adjustable cutting head 18, consisting of a pair of cutting tool holders 19, to engage a vehicle brake assembly (not shown), it is necessary for the on-car brake lathe 10 to be positioned to avoid interference with the vehicle brake caliper, vehicle suspension components, and vehicle body surfaces adjacent the vehicle brake assembly. Accordingly, it is often necessary to utilize the on-car brake lathe 10 in an upright position when resurfacing brake rotors on one side of a vehicle, and to utilize the on-car brake lathe 10 in an inverted position when resurfacing brake rotors on the opposite side of the vehicle. To facilitate operator access to the operator interface 26, the electrical enclosure 24 is rotationally coupled to the on-car brake lathe 10 about a shaft 35, shown in FIG. 4, and is adjustable about a rotational axis EA of the shaft 35, parallel to the drive axis DA, so as to present the operator interface 26 at a selected orientation, independent of the orientation of the on-car brake lathe 10, such as shown in FIG. 5. This enables the on-car brake lathe 10 to be utilized in either an upright configuration, or in an inverted configuration, shown in phantom in FIG. 5, as is sometimes required to facilitate engagement of the adjustable cutting head 18 with a vehicle wheel brake rotors.

Returning to FIG. 3, operator input controls 34 are additionally included on the operator interface 26. The operator input controls 34 preferably include at least a start button 34A, a stop button 34B, a spindle speed control knob 34C, a compensation button 34D, and a runout test button 34E.

Figure 4:
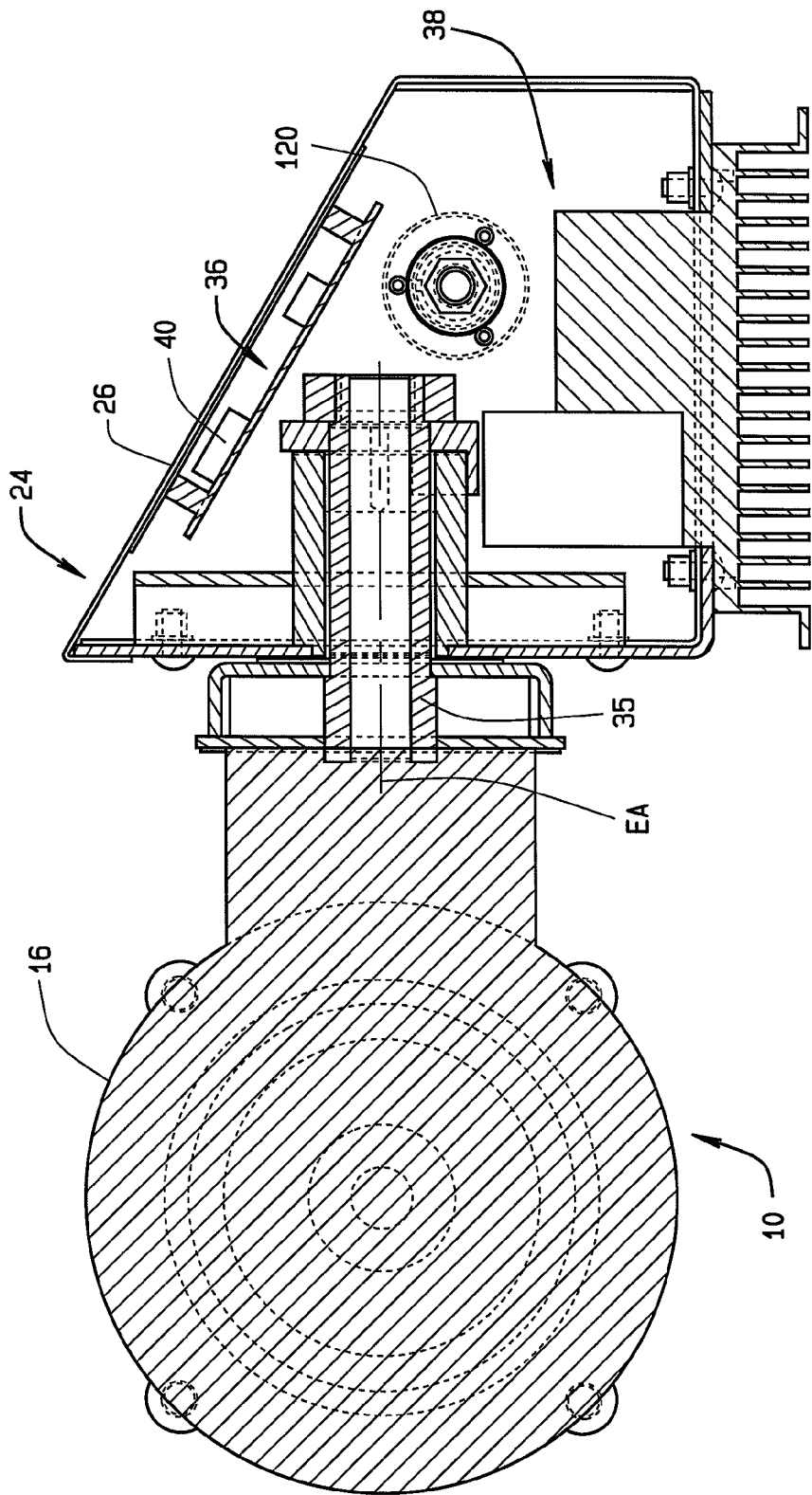
FIG. 4 is a side sectional view of the electrical component enclosure illustrating the coupling to the on-car brake lathe.
Figure 5:
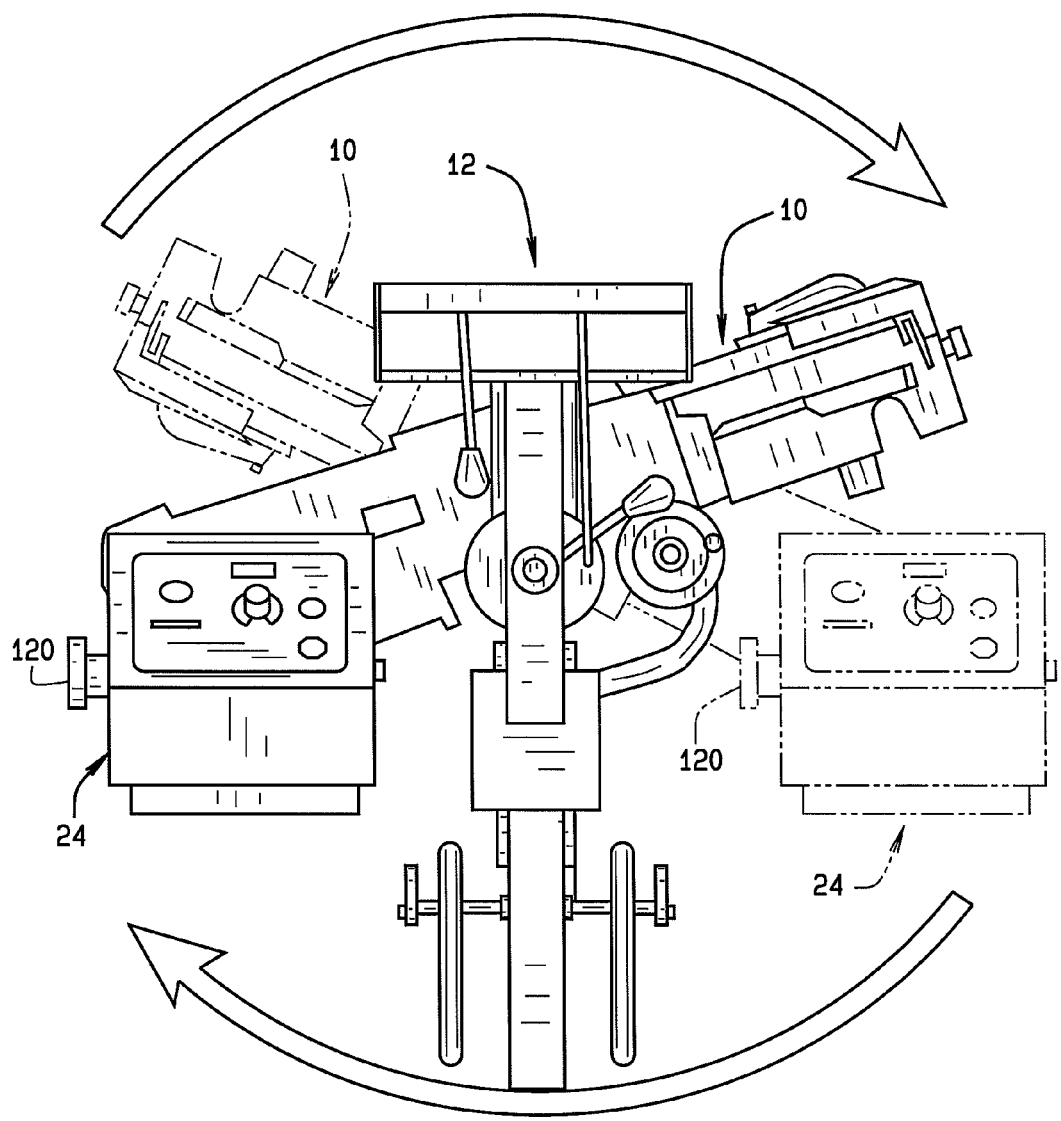
FIG. 5 is an illustration of the orientation of the operator interface with the on-car vehicle brake lathe in both upright and inverted configurations.

Included within the electrical enclosure 24, as shown in FIG. 4 is a processor board 36 and motor controller 38. The processor board 36 incorporates a microprocessor 40, which may be a micro-controller, digital signal processor, or other logic circuit having sufficient capacity to control the functions of the on-car brake lathe 10, and is configured to access and execute instruction sets stored in a suitable electronic memory 40A, such as a RAM, ROM, EPROM, or EEPROM.

Figure 6:
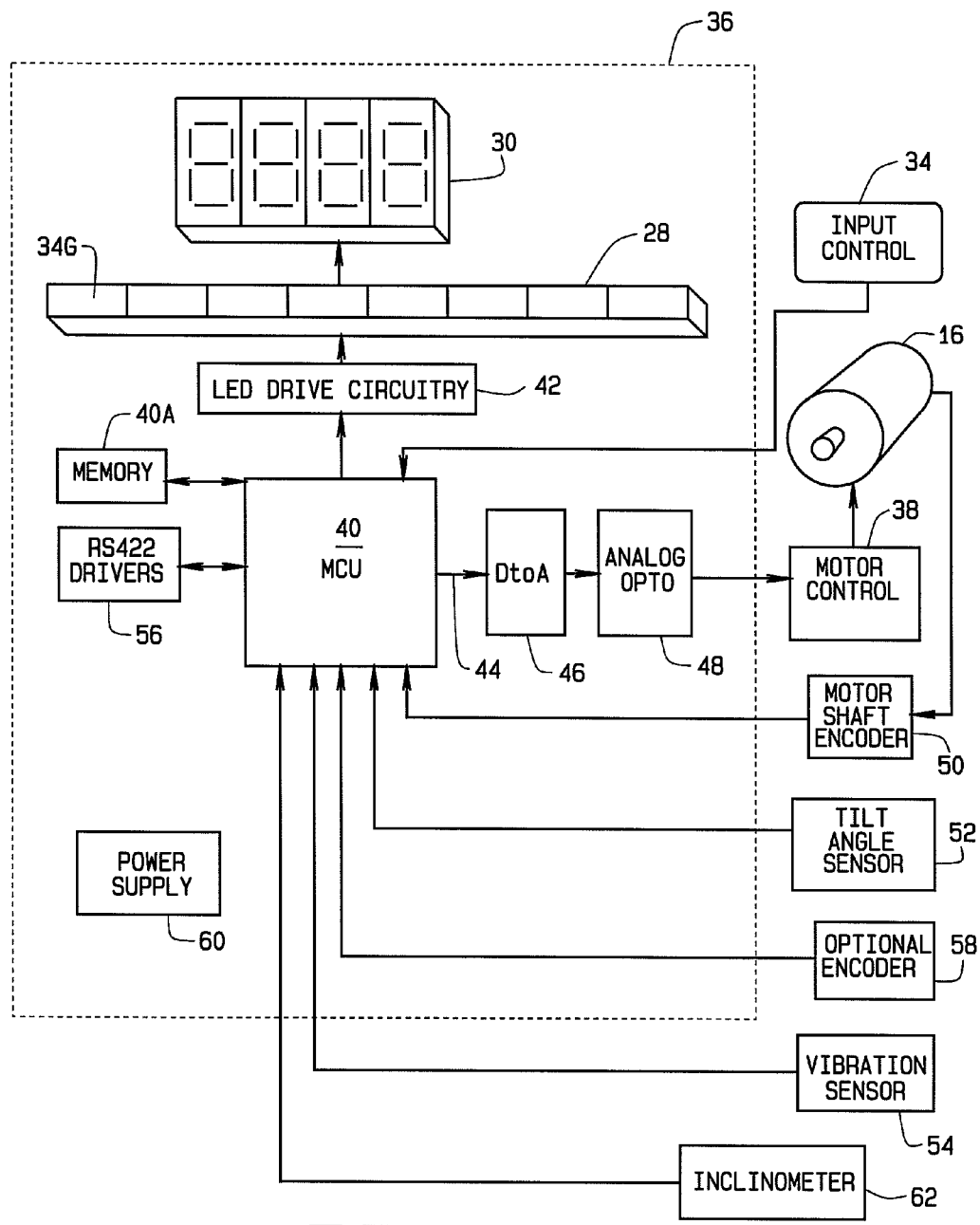
FIG. 6 is a block diagram of a processor board of the on-car brake lathe.

As shown in FIG. 6, the microprocessor 40 is operatively coupled to the motor controller 38 and to an LED drive circuit 42 for controlling the operation of the LED bar graph display 28, LED numeric display 30, and any additional visual display elements 32. The microprocessor 40 is additionally operatively coupled to receive signals from the operator input controls 34. One or more data lines 44 operatively couple the microprocessor 40 to the motor controller 38. The data lines 44 may optionally include a digital to analog converter circuit 46, and/or an analog optical isolator circuit 48, depending upon the particular input requirements of the motor controller 38. The motor controller 38 is in turn, coupled to the variable speed spindle motor 16 to provide electrical power to the motor windings (not shown), thereby controlling the motor output.

As is further seen in FIG. 6, the microprocessor 40 may be operatively coupled to receive input from, or exchange data with, one or more additional components of the on-car brake lathe 10 during operation of the on-car brake lathe 10, as is described below. These components may include, but not limited to, a motor shaft rotational position encoder 50, a lathe tilt angle sensor 52, an vibration sensor or accelerometer 54, a communications circuit 56 such as an RS422 port, or other optional encoder circuits 58, or an inclinometer 62. A suitable power supply 60 for the microprocessor 40 and associated circuits, such as a transformer or AC/DC converter, is provided on the processor board 36.

Preferably the microprocessor 40 is configured to monitor the rotational speed of the variable speed spindle motor 16 using the motor shaft rotational position encoder 50, which is operatively coupled to the shaft of the motor engaged with the output spindle 20. A representation of the rotational speed of the motor 16 may be displayed to an operator by the microprocessor 40 using either the LED bar graph display 28 or the LED numeric display 30. The microprocessor 40 regulates the input signal representative of a desired rotational speed to the motor controller 38, and adjusts the input signal in order to reach or maintain a desired rotational speed or torque of the output spindle 20. The output signal of the motor shaft rotational position encoder 50 is further utilized by the microprocessor 40 to monitor and control the rotational position of the output spindle 20 about an arc of less than 360 degrees, such as for use during runout compensation procedures.

In addition to providing control signals to the motor controller 38 in response to signals from the motor shaft rotational position encoder 50, the microprocessor is preferably configured to provide motor speed controls signals in response to signals received from a potentiometer 42 coupled to the spindle speed control knob 34C, permitting an operator to manually indicate or select a desired rotational speed for the motor 16 and/or output spindle 20. A representation of either the actual rotational speed of the motor 16, or the desired rotational speed as indicated by an operator using the spindle speed control knob 34C, may be displayed on either the LED bar graph display 28 or the LED numeric display 30 by the microprocessor 40.

The microprocessor 40 monitors an output from the tilt angle sensor 52 during the lathe runout compensation procedures and during normal operation of the on-car brake lathe 10. In the event the signals from the tilt angle sensor 52 indicate that the on-car brake lathe 10 inclination has tilted or rotated beyond a predetermined inclination limit, the microprocessor 40 is preferably configured to signal the motor controller 38 to promptly cease rotation of the variable speed spindle motor 16, preventing a potentially dangerous situation. For example, if a vehicle locking differential engages during a brake rotor resurfacing procedure with the on-car brake lathe 10 coupled to the vehicle wheel hub, the resulting change in rotating mass can cause the on-car brake lathe to rotate violently about the drive axis DA, potentially causing serious injury to an operator, damage to the vehicle, or damage to the on-car lathe 10.

In an alternate embodiment, the on-car brake lathe 10 is provided with a simple tilt sensitive switch (not shown) which is responsive to the inclination of the on-car brake lathe structure to switch between an engaged and disengaged configuration. By disposing the tilt sensitive switch in the power line to the variable speed spindle motor 16. Upon inclination of the on-car brake lathe structure beyond a predetermined inclination, the tilt sensitive switch stops a flow of electrical current to the motor 16 as a safety measure.

During a workpiece or brake rotor resurfacing procedure, undesired "chatter" resonance or vibrations may occur which can result in poor quality resurfacing of the brake rotor surface by the cutting head 18, or damage to either the brake rotor or brake lathe components. The "chatter" resonance or vibrations are a function of the spindle RPM, the cutting head linear feed rate, and the depth of cut by the cutting tips. Preferably, a feedback signal representative of a level of "chatter" resonance or vibrations is provided to the microprocessor 40 by one or more suitable sensors. These sensor may include a microphone, an accelerometer, a piezo-electric device, a biased coil, proximity sensor, or any other suitable sensor capable of detect the "chatter" resonance or vibrations generated by the cutting tips when in contact with the workpiece or brake rotor surface.

Figure 3:
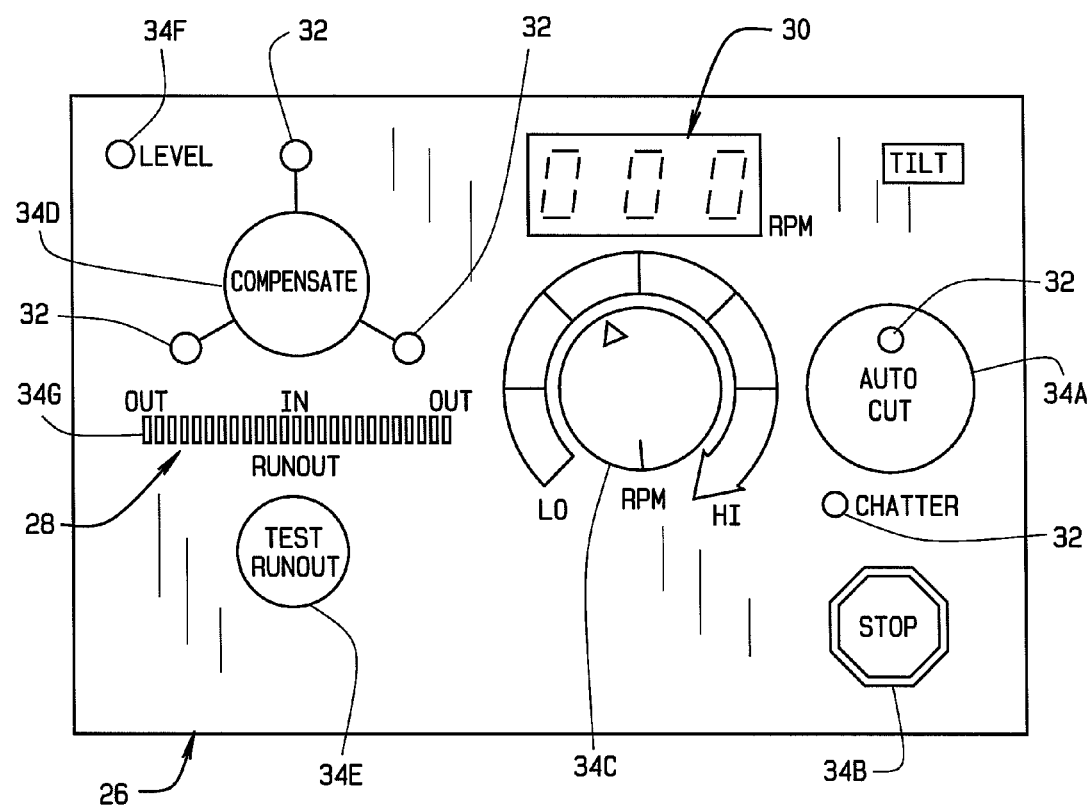
FIG. 3 is a view of the operator interface.

The microprocessor 40 is preferably configured to respond to signals indicating the "chatter" resonance or vibrations have exceeded a predetermined threshold by directing the motor controller 38 to alter either the rotor cutting speed and/or the linear feed rate of the cutting tips. As shown in FIG. 3, a "chatter" LED warning light 32 is optionally controlled by the microprocessor 40 to provide the operator with a suitable warning upon the detection of a chatter condition during a workpiece or rotor resurfacing procedure.

In one embodiment, an on-car brake lathe 10 of the present invention configured with a variable speed spindle motor 16, is operated during a brake resurfacing procedure by the microprocessor 40, at a maximum spindle RPM and linear feed rate for the cutting tips at which the cutting tip vibrations are maintained below a predetermined threshold, i.e. below an acceptable "chatter" level. Those of ordinary skill in the art will recognize that the microprocessor 40 may be configured to begin a brake resurfacing procedure at a maximum spindle RPM and/or linear feed rate, and reduce the rate until the cutting tip vibrations are maintained below a predetermined threshold, i.e. below an acceptable "chatter" level. Alternatively, the microprocessor 40 may be configured to begin the brake resurfacing procedure at a low or minimum spindle RPM and/or linear feed rate, and increase the rate until the cutting tip vibrations exceed a predetermined threshold, i.e. an acceptable "chatter" level, at which point the microprocessor 40 directs the motor controller to reduce the rate.

In an alternate embodiment, an on-car brake lathe 10 of the present invention configured with a drive system or variable speed spindle motor 16, is operated during a brake resurfacing procedure by the microprocessor 40 with a continuously varying spindle RPM. Since it is known that "chatter" is a resonance condition, varying the spindle RPM continuously during a rotor resurfacing procedure prevents the cutting tip vibrations from developing a "static" or standing-waveform conditions in which "chatter" or other resonance conditions can exceed a predetermined threshold. Preferably, the microprocessor 40 is configured to control the drive system or variable speed motor 16 to continuously vary the spindle RPM within a predetermined cutting speed window or range, for example, ±6.0 RPM from an established cutting speed of the spindle during a rotor resurfacing procedure.

For brake lathe systems with an automatic depth of cut control, the microprocessor 40 may be configured to further respond to the detection of "chatter" resonance or vibrations exceeding a predetermined threshold by reducing the depth of cut of the cutting head 18.

Figure 7:
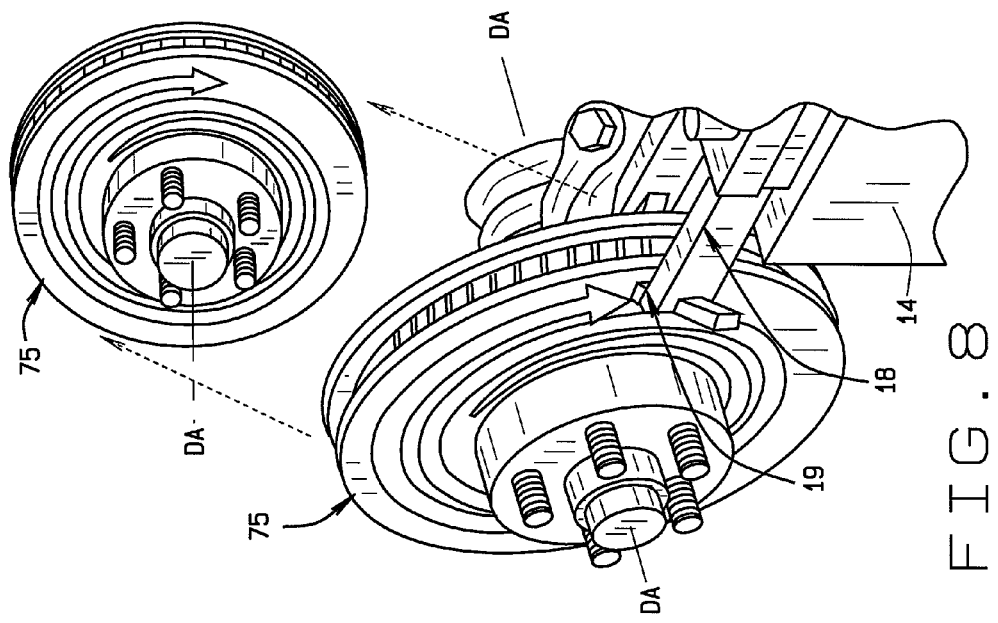
FIG. 7 is a perspective and enlarged view of a cutting head stepwise linear movement relative to a vehicle brake rotor.
Figure 8:
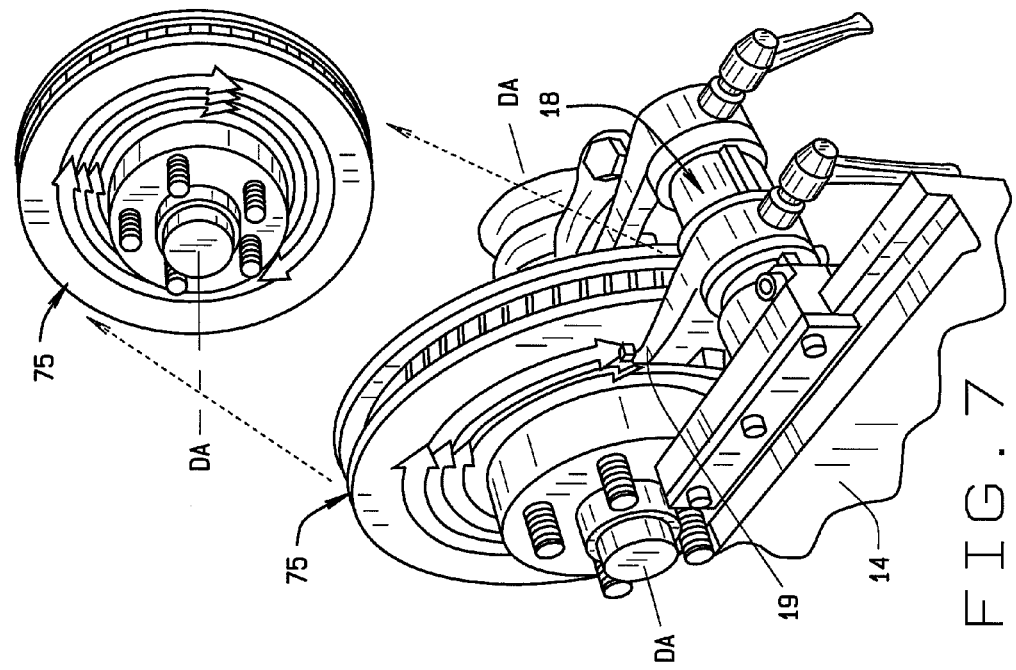
FIG. 8 is a perspective and enlarged view of a cutting head smoothly continuous linear movement relative to a vehicle brake rotor.

In addition to regulating the rotational speed of the spindle 20 through the motor control 38, the microprocessor 40 may optionally be configured to regulate the linear feed rate of the cutting head 18. As shown in FIG. 7, linear movement of the cutting head 18 may be controlled by the microprocessor 40 in a stepwise fashion. After each complete rotation of the vehicle brake rotor 75 as driven by the output spindle 20 (not shown in FIG. 7), the linear position of the cutting head 18 is adjusted, resulting in the cutting tips 19 removing surface material from both sides of the brake rotor 75 in concentric circles. Alternatively, shown in FIG. 8, the linear movement of the cutting head 18 may be controlled by the microprocessor 40 in a smooth continuous fashion. During each rotation of the vehicle brake rotor 75 as driven by the output spindle 20 (not shown in FIG. 8), the linear position of the cutting head 18 is continuously advanced (or retracted), resulting in the cutting tips 19 removing surface material from both sides of the brake rotor 75 along a continuous spiral path.

Figure 9:
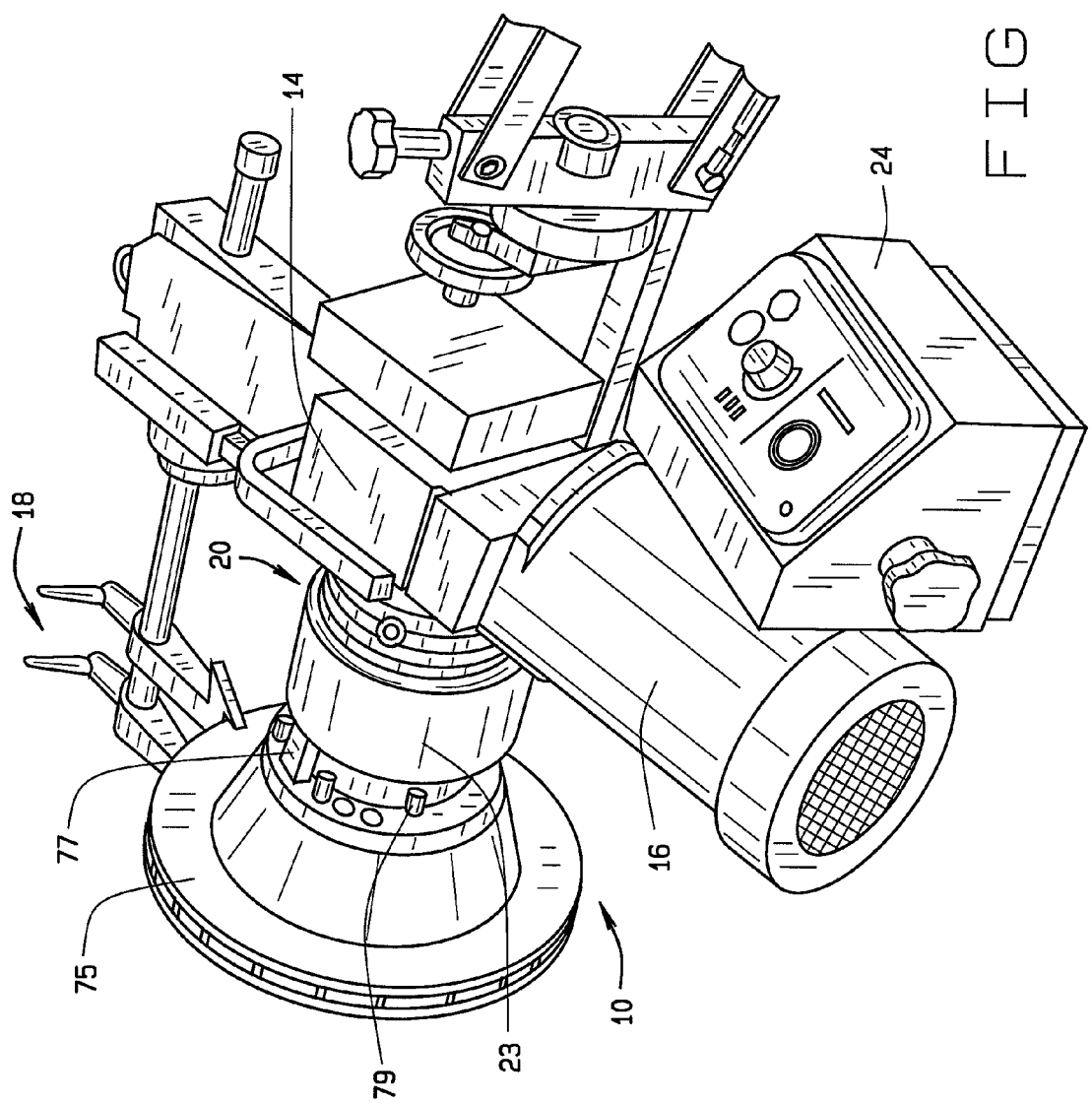
FIG. 9 is a perspective view of the on-car brake lathe of the present invention coupled to a vehicle wheel hub.

During operation, the on-car brake lathe 10 is detachably secured to a vehicle wheel brake rotor on a vehicle axle in a conventional manner as shown in FIG. 9. An adapter 77 is initially secured to the vehicle wheel brake rotor 75 using the vehicle wheel lug nuts or retaining bolts 79. Next, the on-car brake lathe 10 is moved into position such that the aligning joint 22 and drive axis DA are substantially co-linear with a central axis of the rotor-mounted adapter 77, substantially corresponding to a rotational axis of the vehicle wheel brake rotor 75. A threaded retaining shaft (not shown) is passed axially through the support structure 14 and output spindle 20, and engaged with an axial threaded receiving bore (not shown) in the rotor-mounted adapter 77. Tightening of the threaded retaining shaft seats the rotor-mounted adapter 77 against the aligning joint 22, and secures the on-car brake lathe 10 to the vehicle wheel brake rotor 75 to be resurfaced, enabling the vehicle wheel brake rotor 75 to be rotated by the variable speed spindle motor 16 of the on-car brake lathe 10.

As shown in FIG. 10 through FIG. 12, the preferred aligning joint 22 of the present invention comprises a front flange 100, configured to seat against the rotor-mounted adapter 77 and configured for attachment to the output spindle 20. The front flange 100 is operatively coupled to the rear annular member 102 with a non-rotating connection. The connection between the front flange 100 and the rear annular member 102 is configured to permit adjustment of the relative inclination between the front flange 100 and the rear annular member 102, using a single adjustment bolt 104

An adjustment ring 106 is located in an annular recess defined by the front flange 100 and the rear annular member 102 when assembled together. Adjustment ring 106 is free to rotate with respect to the front flange 100 and the rear annular member 102. The adjustment ring 106 contains a pair of fixed wedges 108, a centering bearing 110, and an adjustment wedge 112. The fixed wedges 108 are secured in a permanent position on the adjustment ring 106 by screws 114. The adjustment wedge 112 is secured loosely to the adjustment ring 106 by the adjustment bolt 104.

The bearing 110 maintains the adjustment ring 106 centered in the annular recess so that the adjustment ring 106 is free to rotate. The bearing 110 is secured in the adjustment ring 106 by a spring 116 and a set screw 118.

During use the output spindle 20 is rotated automatically to an adjustment position by the variable speed spindle motor 16. The adjustment ring 106 is then rotated by the operator so that the adjustment wedge 112 is brought into an adjustment position. The adjustment bolt 104 is rotated to bring a tapered surface 120 of the adjustment wedge 112 into contact with the front flange 100 and rear annular member 102. The angle of the tapered surface 120 of the adjustment wedge 112 is greater than the angle of tapered surfaces 122 on each of the fixed wedges 108. This allows the fixed wedges 108 to make full contact with front flange 100 and the rear annular member 102 before the adjustment wedge 112 begins to change the angle of inclination between the front flange 100 and the rear annular member 102. This is necessary to provide stability to the adaptor.

After the fixed wedges 108 seat against the front flange 100 and rear annular member 102, the adjustment wedge 112 is forced between the front flange 100 and the rear annular member 102 by the adjustment bolt 104. The action of the adjustment wedge 112 being forced between the front flange 100 and the rear annular member 102 results in a change in the angle of inclination.

In an alternative embodiment, the adjustment bolt 104 and adjustment wedge 112 of the aligning joint 22 are replaced with a threaded screw or similar adjustment mechanism oriented parallel to the drive axis DA. Movement of the threaded screw parallel to the drive axis DA directly alters the relative inclination between the front flange 100 and the rear flange 102, allowing for compensation for the differences between a wheel rotational axis and the drive axis DA of the on-car brake lathe 10, i.e. runout compensation.

A method of the present invention for compensating for the differences between a wheel rotational axis and the drive axis DA of the on-car brake lathe 10 involves initially coupling the on-car brake lathe 10 to the adapter 77 mounted to the wheel hub with the aligning joint 22 placed between the rotor adaptor 77 and the output spindle 23 as described in above. The adjustment ring 104 is initially free to rotate about the drive axis DA relative to the front flange 100 and the rear flange 102, and the single adjustment bolt 106 loosened to permit retraction of the adjustment wedge 108 from contact with the front flange 100.

After the on-car brake lathe 10 is attached to the vehicle, the operator levels an inclinometer 62 within the electronic enclosure 24 using an adjustment knob 120 to ensure that it is within an operating range. This is done by adjusting the position of the inclinometer 62 until the microprocessor 40 illuminates a level indicator 34F, shown in FIG. 3, or another suitable indicator is provided to the operator. Preferably, prior to beginning the compensation procedure, the variable speed spindle motor 16 is actuated to rotate the output spindle 20 through several complete rotations to "seat" all of the components and to eliminate any binding or stress associated with the attachment of the on-car brake lathe 10 to the vehicle.

To initiate the compensation procedure, the operator actuates an appropriate control 34D, such as shown in FIG. 3. The microprocessor 40 directs the variable speed variable speed spindle motor 16 to operate at a slow speed to sequentially rotate the output spindle 20, and thereby the aligning joint 22 and the vehicle brake rotor 75, to three unique rotational positions about the drive axis DA, stopping at each position to permit a steady-state runout measurement to be acquired.

Preferably, each of the three unique rotational positions is separated by approximately 120 degrees of rotation, and to reach each unique rotational position, the output spindle 20 is rotated through at least one complete revolution about the axis DA. At each rotational position, the rotation is stopped, and a stationary or steady-state angular measurement representative of runout is obtained by the inclinometer 62. Those of ordinary skill in the art will recognize that any of a variety of measurements which are representative of runout may be obtained at each rotational position.

Each steady-state angular measurement is associated with an identified rotational position, as indicted by the motor shaft encoder 50 operatively coupled to the output spindle 20. From the three angular measurements and associated rotational positions, a sinusoidal representation of runout at any rotational position about the drive axis DA is calculated by the microprocessor 40, and a single adjustment rotational position for adaptor 22 is identified.

Methods and procedures for calculation of a sinusoidal representation of runout are set forth in U.S. Pat. No. 5,052,111 to Carter et al., U.S. Pat. No. 5,029,395 to Brauer, U.S. Pat. No. 4,180,915 to Lill et al., and U.S. Pat. No. 4,138,825 to Pelta, each herein incorporated by reference. Those of ordinary skill in the art will recognize that a variety of methods for measurement of lateral runout, requiring a different number of angular, or distance, measurements at a variety of different rotational positions, may be employed with the on-car brake lathe 10 of the present invention to facilitate lateral runout compensation adjustment.

Once the sinusoidal representation of runout has been determined by the microprocessor 40, the variable speed spindle motor 16 is actuated at the direction of the microprocessor 40 to rotate the output spindle 20, and thereby the aligning joint 22 and the vehicle brake rotor 75, about the drive axis DA, until the identified single adjustment rotational position is aligned with a predetermined alignment position, preferably top dead center of the spindle rotation axis DA. With the adjustment ring 104 rotated to the predetermined alignment position, preferably a top-dead-center position, the adjustment bolt 106 is tightened by the operator, driving the adjustment wedge 108 into contact with the front flange 100 and rear annular member 102. The contact with the adjustment wedge 108 alters the relative inclination between the front flange 100 and the rear annular member 102, aligning the drive axis DA with the wheel rotational axis.

Preferably, a visual or audible indicator is utilized to provide the operator with an indication of when the relative inclination between the front flange 100 and the rear annular member 102 has been sufficiently adjusted, as measured by the inclinometer 62, to reduce runout to within a predetermined tolerance. For example, the operator may be instructed to turn the adjustment bolt 106 until a runout display 34G, shown in FIG. 2 turns from red to green.

As shown in FIG. 3, if it is desired to verify the accuracy of the compensation the operator may press a control button 34E, or similar input. Under control of the microprocessor 40, the variable speed spindle motor 16 slowly rotates the output spindle through an arc of approximately 120 degrees. The angular change between the resulting position and the previous compensation position is compared by the microprocessor 40. If the angular change is below a predetermined threshold, preferably an angular change equivalent to 0.002 inches of runout, the runout display 34G will remain green. If the angle change exceeds the threshold, the runout indicator 34G will turn red and it will be necessary for the operator to make additional runout compensation adjustments.

As shown in FIG. 13 through FIG. 15, an alternative prior art aligning joint 22 which may be utilized with the present invention comprises a front flange 150, configured to seat against the rotor-mounted adapter 77 and configured for attachment to the output spindle 20. The front flange 150 is operatively coupled to the rear annular member 152 with a rotating connection. The connection between the front flange 150 and the rear annular member 152 is configured to permit adjustment of the relative inclination between the front flange 150 and the rear annular member 152, using a single adjustment bolt 154. Preferably, an alignment mark is included on the rear flange 152, associated with a predetermined adjustment position.

The adjustment bolt 154 is configured to seat within a bore 156 disposed in a reseted portion 158 of the rear annular member 152, perpendicular to the drive axis DA. The bore 156 passes through the rear annular member 152, intersecting an adjustment chamber 160. The adjustment chamber 160 defines an opening in the front face 162 of the rear annular member 152, within which is seated an adjustment wedge 164. The adjustment wedge 164 is a rectangular block, seated within the adjustment chamber 160, having an adjustment surface 166 disposed adjacent the rear face 168 of the front flange 150, and an inclined longitudinal channel 170 on an opposite face. The inclined longitudinal channel 170 abuts a tapered portion 172 of the adjustment bolt 154 passing through the adjustment chamber 160. Axial movement of the adjustment bolt 154 within the bore 156 results in a sliding contact between the tapered portion 172 and the inclined longitudinal channel 170 of the adjustment wedge 164.

The adjustment wedge 164 is restrained against movement perpendicular to the drive axis DA by the interior surface of the adjustment chamber 160. Sliding contact between the adjustment wedge 164 and the adjustment chamber 160 results in movement of the adjustment wedge 164 parallel to the drive axis DA, either towards or away from the rear face of the front flange 150. The direction of movement is dependant upon the direction of the sliding contact. The resulting movement of the adjustment wedge 164 operates to alter the relative inclination between the front flange 150 and the rear flange 152, responsive to the adjustment of the single adjustment bolt 154, providing runout compensation in substantially the same manner of operation as the embodiment shown in FIG. 10 through FIG. 12.

Figure 16:
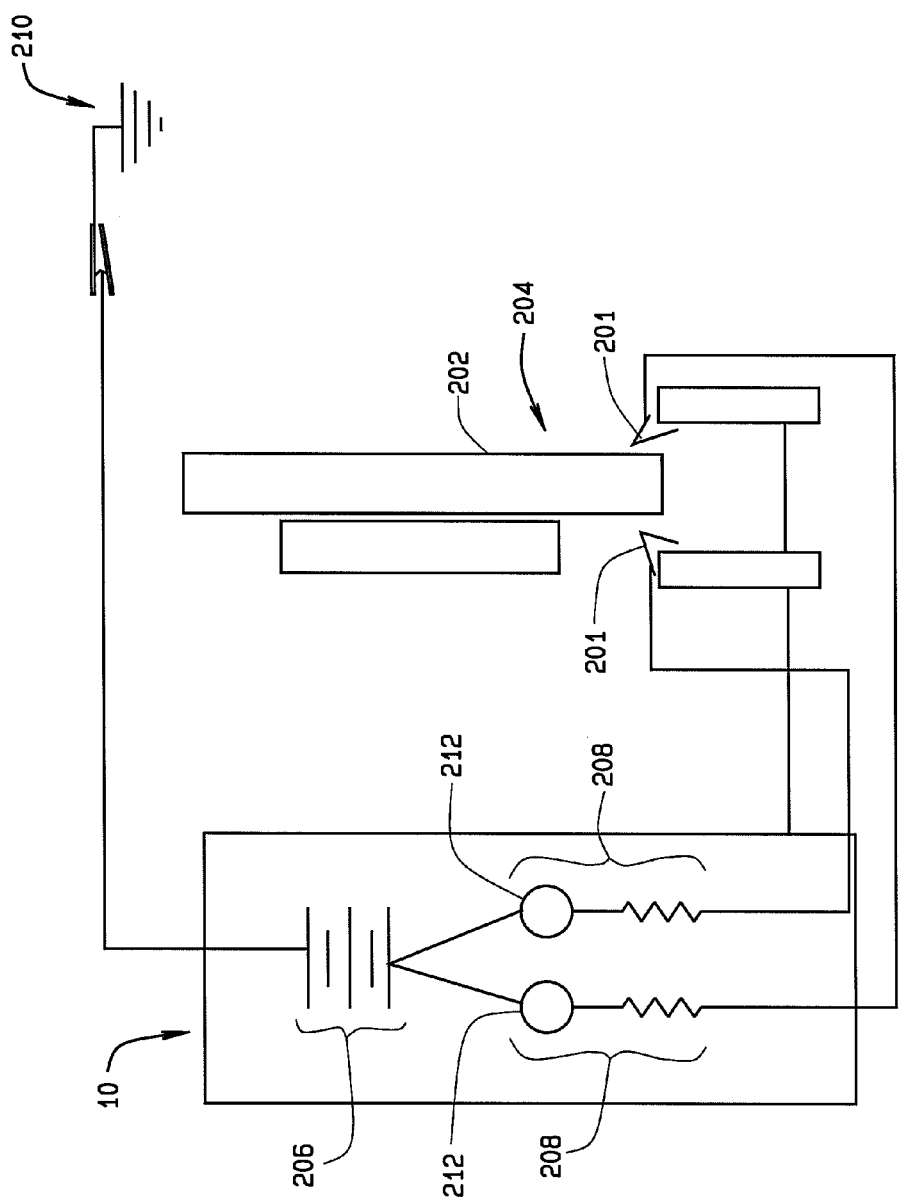
FIG. 16 is a simplified circuit diagram illustrating the components of a brake lathe cutting tip contact indicator embodiment of the present invention.
Figure 17:
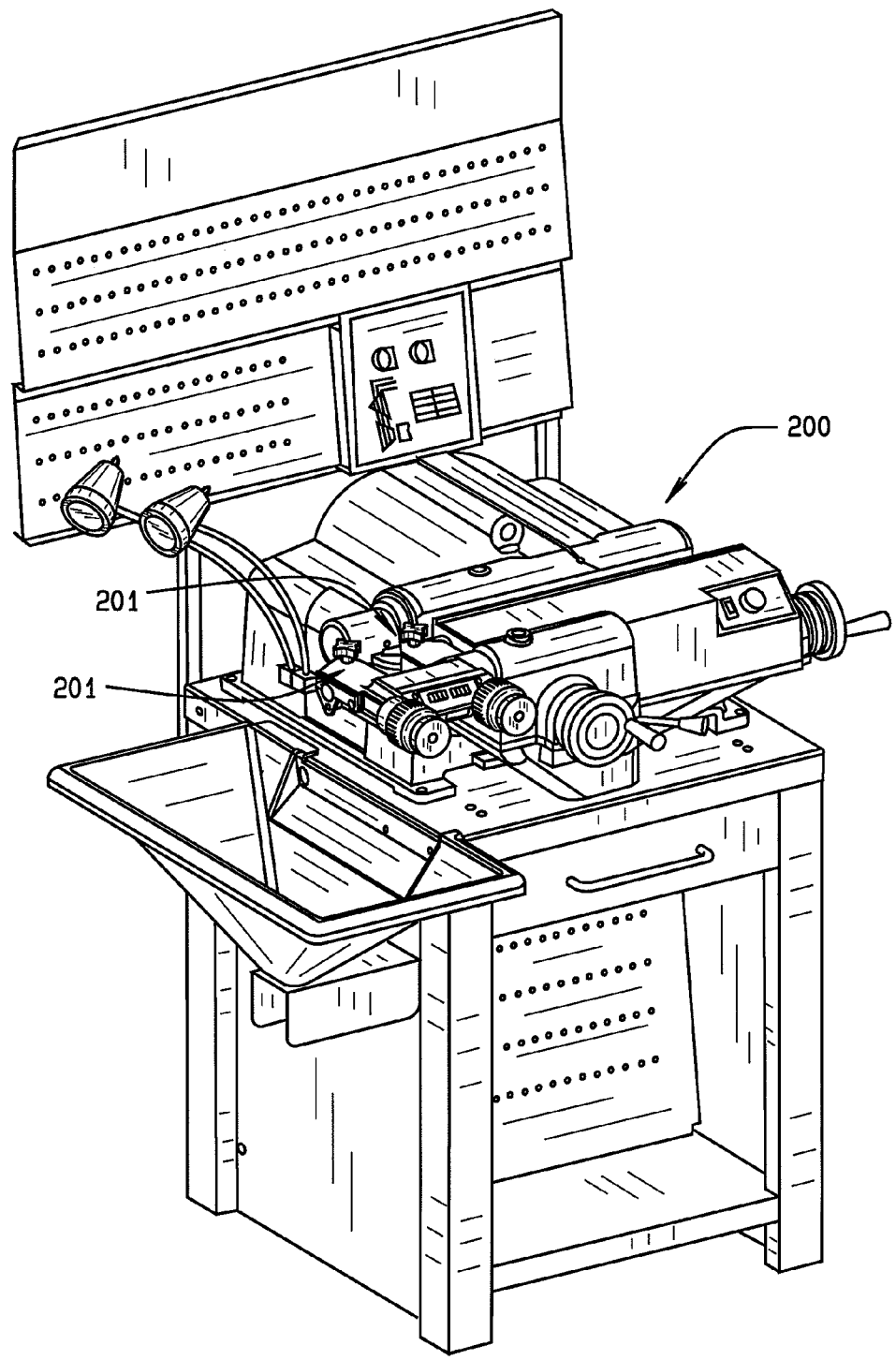
FIG. 17 is a perspective view of a bench brake lathe.

During operation of an alternate embodiment of the on-car brake lathe 10, a cutting tip contact indicator circuit, shown in FIG. 16, provides an operator with a visual indication of contact between each cutting tip 201 and a surface 202 of a brake rotor 204. While described below in the context of an on-car brake lathe 10, those of ordinary skill in the art will recognize that the cutting tip contact indicator circuit described herein may be readily adapted and utilized for use with a bench brake lathe, such as shown at 200 in FIG. 17, and hence such an embodiment is considered within the scope of this invention.

Each cutting tip 201 is electrically coupled, to a power source 206, such as a battery, to an associated indicator circuit 208, and to an electrical ground 210. Contact between a cutting tip 201 and the brake rotor surface 202 completes an electrical circuit between the electrical ground 210 and the power source 206, resulting in an electrical current flow through an associated indicator circuit 208. Preferably, the associated indicator circuit 208 incorporates one or more LEDs 212, which are correspondingly illuminated by the flow of electrical current to provide the operator with a visual confirmation of contact between the cutting tip 201 and the brake rotor surface 202.

Figure 18:
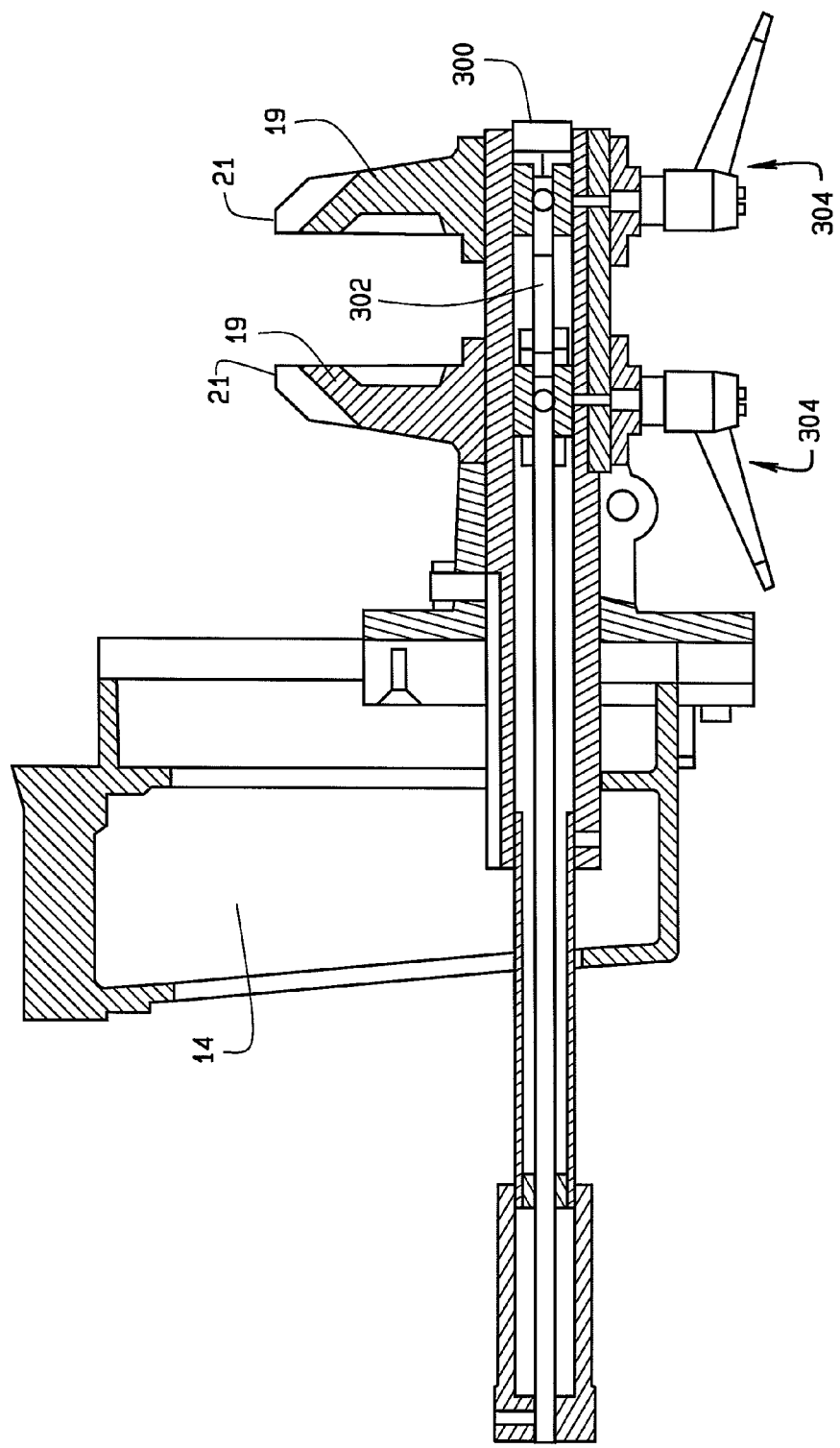
FIG. 18 is a sectional view of the brake lathe cutting tip assembly, illustrating the placement of a rotary encoder and threaded shaft.

For some applications, it is desirable to provide an operator with a visual indication of a depth of cut for the cutting tips. In an alternate embodiment on-car brake lathe 10 of the present a visual indication is provided in the form of a numerical depth-of-cut display, but may take the form of a bar graph or other suitable visual measurement indication. Information provided to the operator on the depth-of-cut display is based on signals received at the microprocessor 40 from a rotary encoder 300 operatively coupled to the cutting head 18, as shown in FIG. 18. The rotary encoder 300 is disposed at an end of a threaded shaft 302 upon which the individual cutting tip holders 19 are disposed. Rotation of the threaded shaft 302 in a first direction moves each cutting tip holder 19 in a first direction, i.e., towards each other. Correspondingly, rotation of the threaded shaft 302 in the opposite direction moves each cutting tip holder 19 in the opposite direction, i.e. apart from each other. Each individual cutting tip holder 19 may be selectively locked in place relative to the threaded shaft 302 by a conventional locking mechanism 304, such that only one cutting tip holder 19 moves at a time.

To measure a depth-of-cut for a single cutting tip holder 19, the cutting tip 21 of a cutting tip holder 19 is initially moved into contact with the surface of a brake rotor 75. Upon contact, the signal from the rotary encoder 300 is either "zeroed" or recorded by the microprocessor 40. Subsequent movement of the cutting tip holder 19, as tracked by the signals from the rotary encoder 300, is displayed to the operator on a depth-of-cut display, and corresponds to a measured displacement from the previously "zeroed" or recorded position. The indication of initial contact between the cutting tip 21 and the vehicle brake rotor 75 may be either manually provided by an operator or automatically detected with a contact sensor signal as previously described. Once the desired depth-of-cut for the selected cutting tip holder 19 is reached, the cutting tip holder 19 is locked in place with the locking mechanism 304, and the process repeated for the second cutting tip holder 19 relative to the opposite face of the vehicle brake rotor 75. The ability to predict the final thickness of a rotor after the selection of a desired depth of cut permits an operator to determine of the resulting final thickness will be less than a recommended minimum thickness, and to determine if the rotor should be replaced rather than resurfaced.

The cutting tip holder movement signal from the rotary encoder 300 may be further utilized by the microprocessor 40 to provide a thickness or displacement measurement between the two cutting tip holders 19 of the cutting head 18. To provide a displacement measurement, a calibration block of a predetermined thickness, such as 1.000 inches, is placed between the two cutting tip holders 19. The two cutting tip holders 19 are then moved to contact the associated cutting tips 21 with opposite sides of the calibration block. The operator then indicates that the cutting tip holders 19 are in a calibration displacement, and the microprocessor 40 associates the current signal from the rotary encoder 300 to the predetermined size of the calibration block. Subsequent movement of the cutting tip holders 19, either relatively towards or away from each other, is registered by the rotary encoder 300, and used to calculate a current displacement distance between each of the cutting tip holders 19.

The displayed value of depth of cut may also be used by the operator to predict the final thickness of a vehicle brake rotor 75 after selection of a desired depth-of-cut, or to measure the amount of runout present in each face of the vehicle brake rotor 75. Vehicle brake rotor face runout is independent of the runout present between the mounting of the on-car brake lathe 10 and the wheel hub. A cutting tip 21 is brought into initial contact with the highest point on a vehicle brake rotor face, i.e. the point on having the greatest measure of lateral runout in an outward direction. At this point, the signal from the rotary encoder 300 may be associated with the peak runout, or "zeroed" by the microprocessor 40 Subsequent movement of the cutting tip 21 to the lowest point on the vehicle brake rotor 75, i.e. the point on the face having the least measure of lateral runout in an outward direction, and comparison of the signal from the rotary encoder 300 with the previously associated signal, provides an indication of runout present in that face of the vehicle brake rotor 75.

For some vehicle brake lathe applications, it is desirable for the brake lathe 10 to communicate with one or more remote vehicle service systems or computers. In an alternate embodiment, the microprocessor 40 of the on-car brake lathe 10 is operatively coupled to a communication circuit 56, such as an serial communications link, for exchanging information with a remote computer system, or one or more automotive service devices, such as a vehicle wheel aligner or a vehicle wheel balancer (not shown). The microprocessor 40 of the on-car brake lathe 10 is optionally configured to receive brake rotor specifications, such as diameter and thickness values, and may optionally be configured to communicate brake rotor resurfacing results to a remote display associated with the on-car brake lathe 10, or a remotely disposed printer or console. The microprocessor 40 may be further configured to utilize the received brake rotor specifications to establish limits on the range of linear movement for the cutting head 18, or to establish an initial cutting speed and linear feed rate for a variable speed spindle motor 16.

The present invention can be embodied in-part in the form of computer-implemented processes and apparatuses for practicing those processes. The present invention can also be embodied in-part in the form of computer program code containing instructions embodied in tangible media, such as floppy diskettes, CD-ROMs, hard drives, or an other computer readable storage medium, wherein, when the computer program code is loaded into, and executed by, an electronic device such as a computer, micro-processor or logic circuit, the device becomes an apparatus for practicing the invention.

The present invention can also be embodied in-part in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented in a general-purpose microprocessor, the computer program code segments configure the microprocessor to create specific logic circuits.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

The invention claimed is:

1. A method for reducing vibrations during resurfacing of a vehicle brake component with a brake lathe having a variable speed spindle motor, an output spindle rotationally driven by the variable speed motor adapted to couple the brake lathe to a vehicle brake component, and at least one adjustable cutting tip adapted to engage a surface of the vehicle brake component, comprising the steps of:
   detecting vibrations resulting from contact between the at least one adjustable cutting tip with a vehicle brake component surface;
   altering a drive speed of the variable speed spindle motor responsive to a level of said detected vibrations exceeding a predetermined threshold.

2. The method of claim 1 wherein altering a drive speed of the variable speed spindle motor alters a linear feed rate associated with the at least one adjustable cutting tip.

3. The method of claim 1 wherein altering a drive speed of the variable speed spindle motor alters a rotational speed of the output spindle.

4. The method of claim 1 wherein further including the step of altering a placement position of at least one cutting tip responsive to a level of said detected vibrations exceeding a predetermined threshold to alter a depth of cut on a brake component surface.

5. A method for reducing the development of vibrations during resurfacing of a vehicle brake component with a brake lathe having a variable speed spindle motor, an output spindle rotationally driven by the variable speed motor adapted to couple the brake lathe to a vehicle brake component, and at least one adjustable cutting tip adapted to engage a surface of the vehicle brake component, comprising the step of:
   altering a drive speed of the variable speed spindle motor to a rotational speed of the output spindle during engagement of the at least one cutting tip with the surface of the vehicle brake component.

6. The method of claim 5 wherein said step of altering said drive speed of the variable speed spindle motor includes continuously varying said drive speed within a predetermined speed range to continuously vary said rotational speed of the output spindle.

7. The method of claim 5 wherein said step of altering said drive speed of the variable speed spindle motor includes varying said drive speed in a stepwise manner within a predetermined speed range at discrete intervals.

8. The method of claim 5 wherein further including the step of altering a drive speed of the variable speed spindle motor to alter a linear feed rate associated with the at least one adjustable cutting tip.

9. A method for attenuating vibrations during resurfacing of a vehicle brake component with a brake lathe having a controller, a rotationally driven output spindle adapted to couple the brake lathe to a vehicle brake component, and at least one adjustable cutting tip adapted to engage a surface of the vehicle brake component, comprising the step of:
   utilizing the controller to automatically alter a rotational speed of the output spindle during cutting engagement of the at least one cutting tip with the surface of the vehicle brake component.

10. The method of claim 9 wherein the controller is programmable, and further including the step of programming the controller to automatically vary said rotational speed of the output spindle during cutting engagement of the at least one cutting tip with the surface of the vehicle brake component.

11. The method of claim 9 further including the step of utilizing the controller to automatically alter a linear feed rate associated with the at least one adjustable cutting tip.

12. A method for attenuating vibrations during resurfacing of a vehicle brake component with a brake lathe having a programmable controller, a rotationally driven output spindle adapted to couple the brake lathe to a vehicle brake component, and at least one adjustable cutting tip adapted to engage a surface of the vehicle brake component, comprising the steps of:

programming the controller to regulate a rotational speed of the output spindle;

and, utilizing the controller to vary a rotational speed of the output spindle in response to said programming, during cutting engagement of the at least one cutting tip with the surface of the vehicle brake component.

13. The method of claim 12 wherein the step of utilizing the controller to vary a rotational speed of the output spindle further includes controlling a variable speed spindle motor operatively coupled to drive the output spindle at said rotational speed.

14. The method of claim 11 further including the steps of programming the controller to regulate a linear feed rate of the at least one adjustable cutting tip, and utilizing the controller to automatically alter a linear feed rate associated with the at least one adjustable cutting tip.

15. A brake lathe for resurfacing of a vehicle brake component, comprising:

a variable speed spindle motor carried by a support structure and controlled by a motor controller;

an output spindle carried by the support structure and rotationally driven by the variable speed motor, said output spindle adapted to couple the brake lathe to the vehicle brake component during a resurfacing procedure;

at least one adjustable cutting tip carried by the support structure and adapted to engage a surface of the vehicle brake component during the resurfacing procedure; and a microprocessor operatively coupled to the motor controller, said microprocessor configured to direct the motor controller to alter a drive speed of the variable speed spindle motor to attenuate vibrations occurring during the resurfacing procedure.

16. The brake lathe of claim 15 wherein altering the drive speed of the variable speed spindle motor alters a linear feed rate associated with the at least one adjustable cutting tip.

17. The brake lathe of claim 15 wherein altering the drive speed of the variable speed spindle motor alters a rotational speed of the output spindle.

18. The brake lathe of claim 17 wherein the microprocessor is further configured to direct the motor controller to continuously vary the drive speed of the variable speed spindle motor within a predetermined speed range to continuously vary the rotational speed of the output spindle.

19. The brake lathe of claim 17 wherein the microprocessor is further configured to direct the motor controller to vary the drive speed of the variable speed spindle motor in a stepwise manner within a predetermined speed range over discrete intervals to continuously vary the rotational speed of the output spindle.

20. The brake lathe of claim 15 wherein said microprocessor is further configured to control adjustments to a placement position of the at least one cutting tip to alter a depth of cut by the cutting tip on the vehicle brake component surface responsive to a level of said detected vibrations exceeding a predetermined threshold.

* * * * *